United States Patent [19]
Yang

[11] Patent Number: 5,242,137
[45] Date of Patent: Sep. 7, 1993

[54] OVERHEAD CONDUCTOR CARRIER

[76] Inventor: Chin-Hui Yang, 4F., No. 2, Lane 409, Chung Cheng Rd., Hsin Tien City, Taipei Hsien, Taiwan

[21] Appl. No.: 808,759

[22] Filed: Dec. 17, 1991

[51] Int. Cl.⁵ .............................................. F16L 3/00
[52] U.S. Cl. ..................................... 248/49; 248/68.1
[58] Field of Search ...................... 248/49, 68.1, 58, 59

[56] References Cited

U.S. PATENT DOCUMENTS 3,960,350  6/1976  Tardoslcegyl ............... 248/68.1 X

FOREIGN PATENT DOCUMENTS 2436318  5/1980  France ............................. 248/49
1253577  11/1971  United Kingdom ............. 248/49

Primary Examiner—Alvin C. Chin-Shue
Attorney, Agent, or Firm—Varndell Legal Group

[57] ABSTRACT

An overhead conductor carrier, comprising a conductor carrying frame assembly which is comprised of two parallel rails with a plurality of adjustable crossed rods connected therebetween for carrying conductors, and a suspension gear to suspend said conductor carrying frame assembly from the ceiling of a factory building which is comprised of two adjustable lateral stays connected by a link block for bearing said conductor carrying frame assembly. The pitch between the two parallel rails can be adjusted by changing the contained angles of the adjustable crossed rods, according to the quantity of conductors to be carried. The two adjustable lateral stays can be set adjacent to or apart from each other so as to change the total width of the suspension gear according to the width between the two parallel rails.

1 Claim, 5 Drawing Sheets

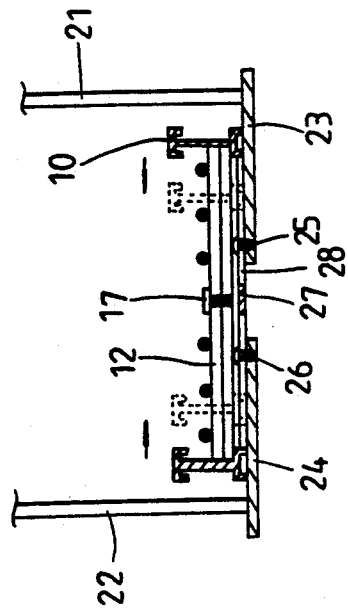
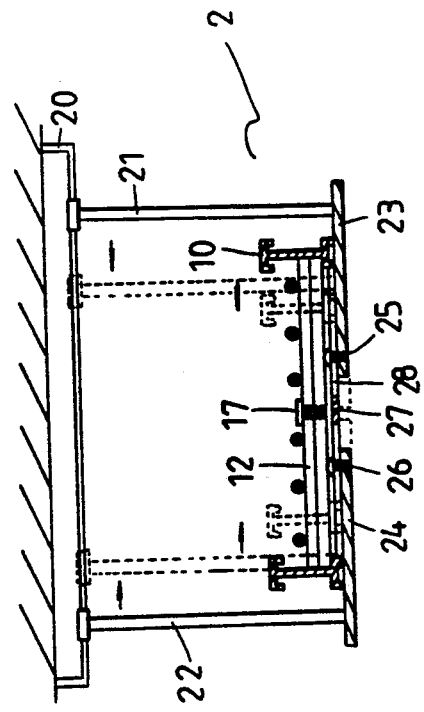
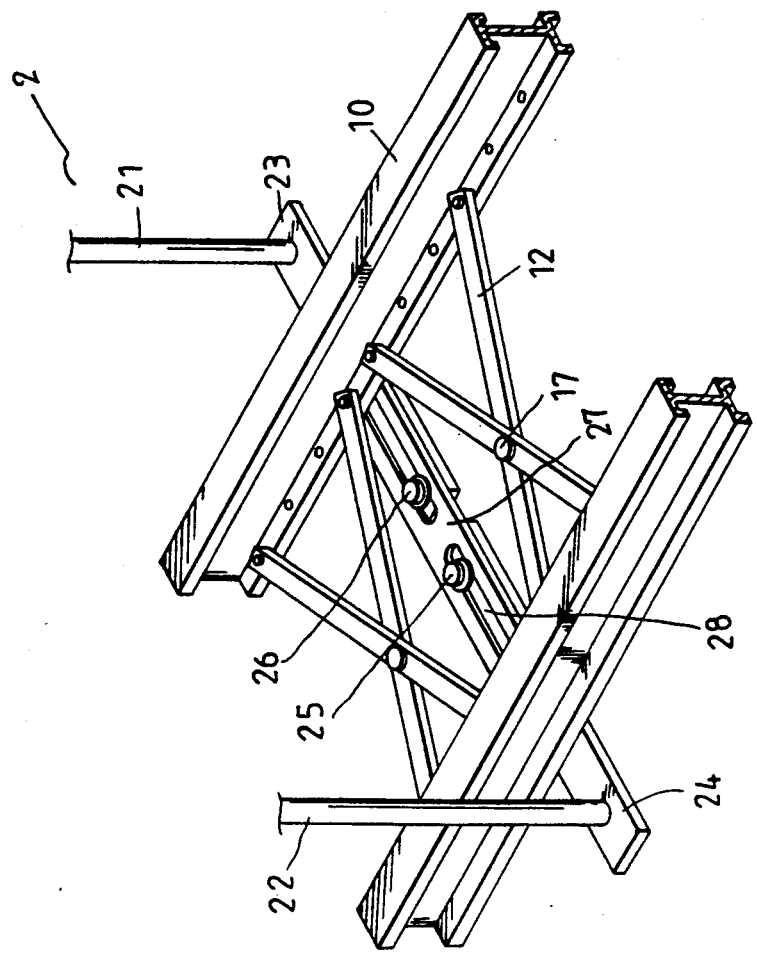

OVERHEAD CONDUCTOR CARRIER

BACKGROUND OF THE INVENTION

The present invention relates to overhead conductor carriers and relates more particularly to an overhead conductor carrier suspended from a ceiling for carrying conductors which can be conveniently adjusted according tot he amount of conductors to be carried.

In factory buildings, conductors which are used to provide a factory with electricity are generally arranged overhead. Fixed type of conductor carriers are commonly used in carrying overhead conductors. A conductor carrier can be a framework or U-shaped bracket fixedly secured to the ceiling of a factory building through the process of welding or by fastening means. Fixedly welded a framework to the ceiling may destroy the internal sense of beauty of a factory building. Because either type of conventional conductor carriers are made in fixed structure and not adjustable, they occupy much space during delivery and difficult to install. Once a conductor carrier is fastened in place, it can not be adjusted according to the quantity of conductors to be carried. Sometimes two or more conductor carriers should be connected together for holding a big bundle of conductors.

SUMMARY OF THE INVENTION

The present invention has been accomplished to eliminate the aforesaid disadvantages. It is therefore an object of the present invention to provide an overhead conductor carrier which can be conveniently adjusted according to the quantity of conductors t be carried. It is another object of the present invention to provide an overhead conductor carrier which can be collapsed to reduce space occupation during its delivery. It is still another object of the present invention to provide an overhead conductor carrier which is easy to assembly, convenient to install, and inexpensive to manufacture. It is still another object of the present invention to provide an overhead conductor carrier which does not destroy the sense of beauty of a factory building to which it is fastened.

According to the present invention, an overhead conductor carrier is generally comprised of a conductor carrying frame assembly suspended from the ceiling of a factory building by a suspension gear. The conductor carrying frame assembly is comprised of two parallel rails and a plurality of adjustable crossed rods connected therebetween by Adjusting the contained angles of the adjustable crossed rods, the pitch between the two parallel rails is changed. The suspension gear comprises two adjusting screws for supporting the conductor carrying frame assembly. By means of the adjusting screws, the total width of the suspension gear can be conveniently adjusted according to the width between the two parallel rails.

BRIEF DESCRIPTION OF THE DRAWINGS

FIG. 6 is a perspective view of an overhead conductor carrier as constructed according to the present invention, in which an overhead conductor carrying frame assembly is supported on a suspension gear;

FIGS. 7 and 8 illustrate that the suspension gear is adjusted to change the range between the two suspension rods thereof;

DETAILED DESCRIPTION OF THE PREFERRED EMBODIMENTS

Figure 2:
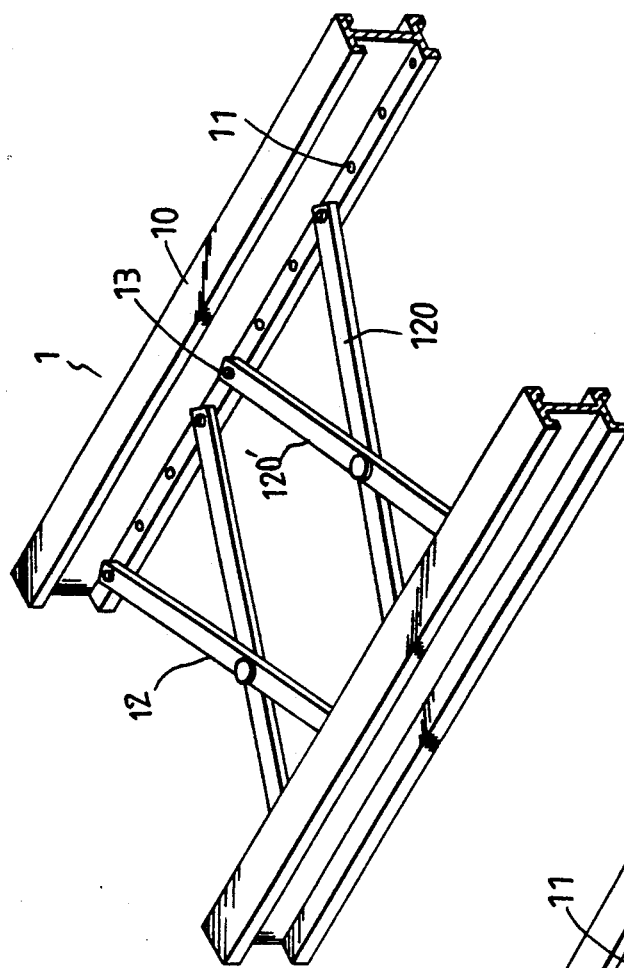
FIG. 2 is an assembly view of the overhead conductor carrying frame assembly of FIG. 1.
Figure 1:
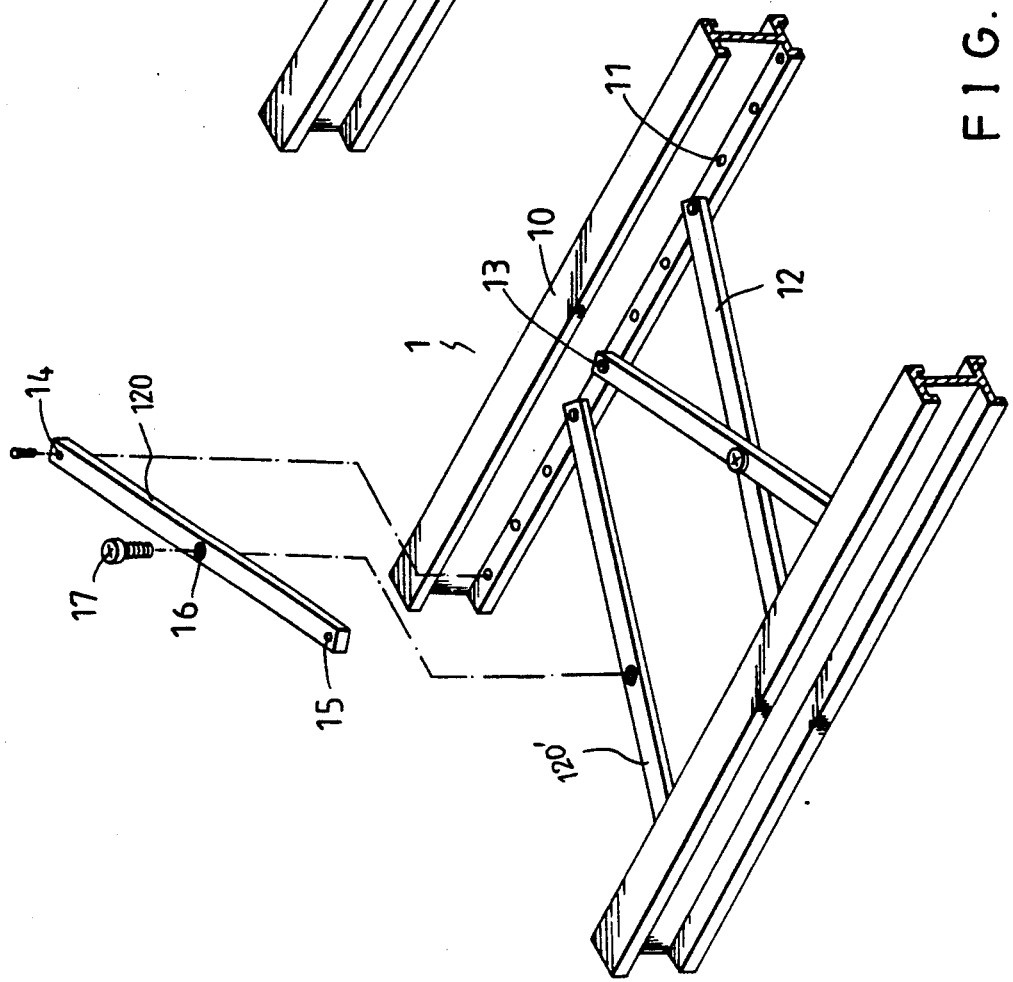
FIG. 1 is a partly exploded perspective view of an overhead conductor carrying frame assembly as constructed according to the present invention.

Referring to FIGS. 1 and 2, an overhead conductor carrying frame assembly 1 is generally comprised of two parallel rails 10 and a plurality of crossed rods 12 connected therebetween. The two parallel rails 10 each has a plurality of holes 11 at an inner side equidistantly arranged in a line in longitudinal direction for connecting the crossed rods 12 by screws 13. Each crossed rod 12 is consisted of two rod elements 120, 120' connected together in the form of a cross. Each rod element 120 or 120' has a first hole 16 at the middle, a second hole 14 and a third hole 15 at two opposite ends. By aligning the first hole 16 of one rod element 120 with the first hole 16 of another rod element 120', two rod elements 120, 120' are connected into a crossed rod 12 by a screw 17, in the form of a cross. By aligning the second holes 14 and the third holes 15 of the two rod elements 120, 120' of each crossed rod 12 with either hole 11 on either of the two parallel rails 10, each crossed rod 12 can be conveniently connected between the two parallel rails 10 by screws 13 (as shown in FIG. 2.

Figure 5:
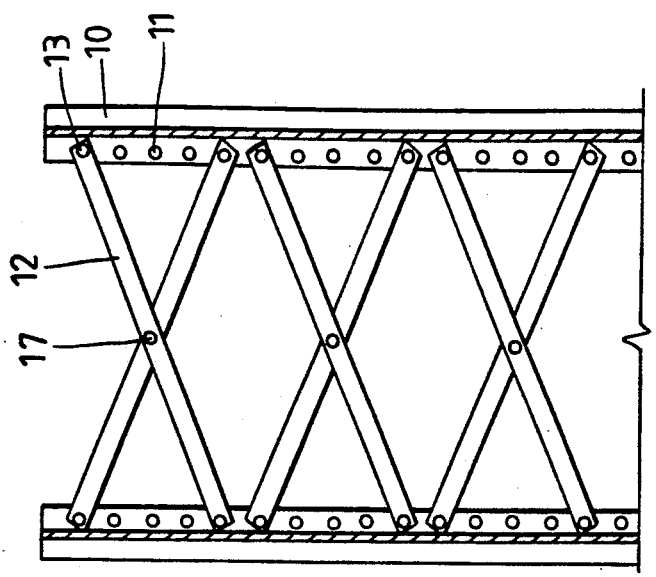
FIGS. 3, 4, and 5 illustrate that the overhead conductor carrying frame assembly of FIG. 1 is adjusted to change the pitch between the two parallel rails thereof.
Figure 4:
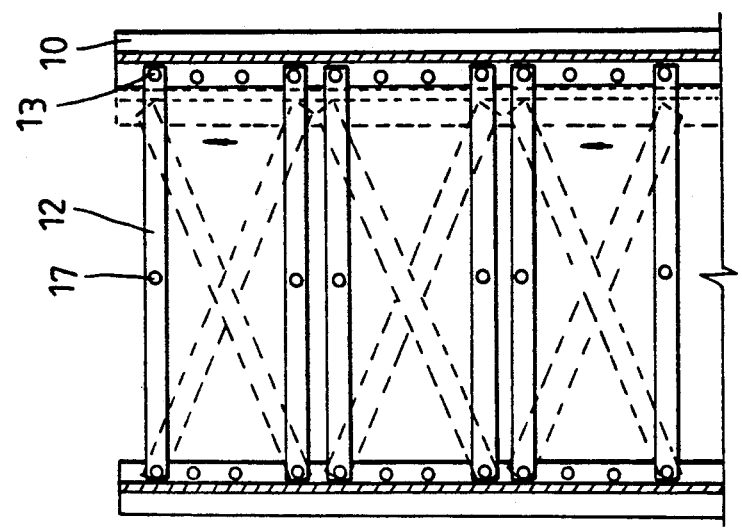
Figure 3:
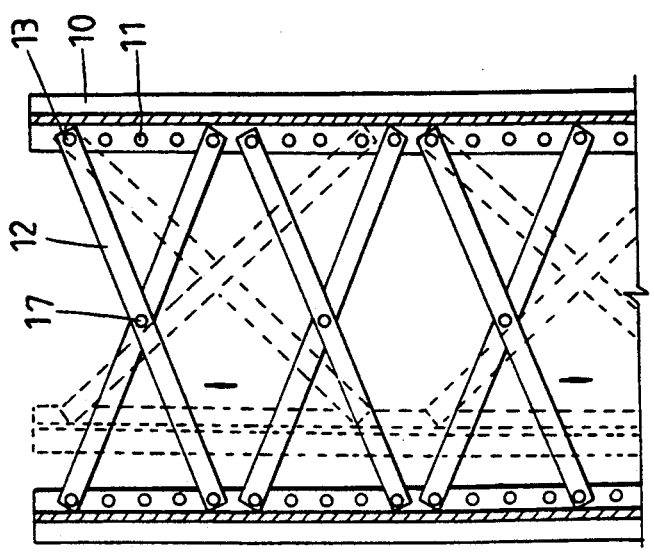

Referring to FIGS. 3, 4 and 5, by changing the contained angle of the two rod elements 120, 120' of each crossed rod 12 (by changing the connecting position of the second hole 14 or third hole 15 of each crossed rod 12 on the holes 11 on either one of the two parallel rails 10), the pitch between the two parallel rails 10 is adjusted.

Referring to FIGS. 6, 7 and 8, an overhead conductor carrying frame assembly 1 may be suspended from a ceiling by a suspension gear 2. The suspension gear 2 comprises an U-shaped cross bar 20 fixedly fastened to a ceiling inside a factory building, two suspension rods 21, 22 movably hanging on the U-shaped cross bar 20 at two opposite ends, two lateral stays 23, 24 respectively connected to the two suspension rods 21, 22, and a link block 27 connected to the two lateral stays 23, 24 between the two suspension rods 21, 22. The link block 27 has two sliding grooves 28 longitudinally aligned for adjustably connecting the two lateral stays 23, 24. The two lateral stays 23, 24 each has one end fixedly secured to either suspension rod 21 or 22 and an opposite end connected to either sliding groove 28 by an adjusting screw 25 or 26. By means of the control of the adjusting screws 25, 26, the two lateral stays 23, 24 can be moved inwards or outwards relative to each other so as to adjust the range between the two suspension rods 21, 22 according to the pitch between the two parallel rails 10, 10' of the conductor carrying frame assembly 1 supported thereon.

Figure 10:
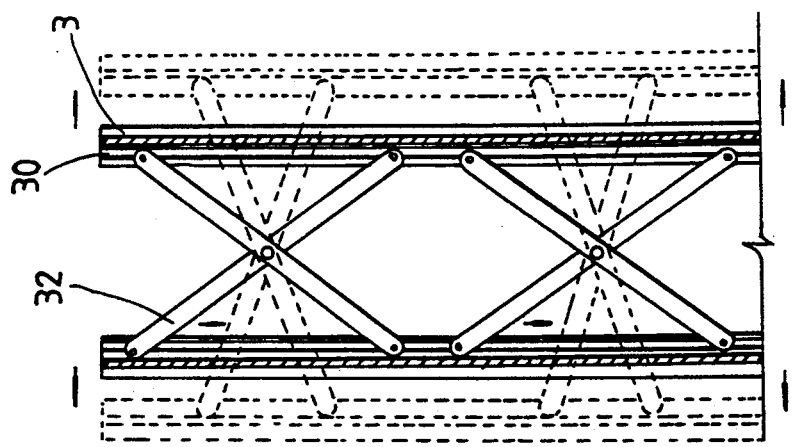
FIG. 10 illustrates that the overhead conductor carrying frame assembly of FIG. 9 is adjusted to change the pitch between the two parallel rails thereof.
Figure 9:
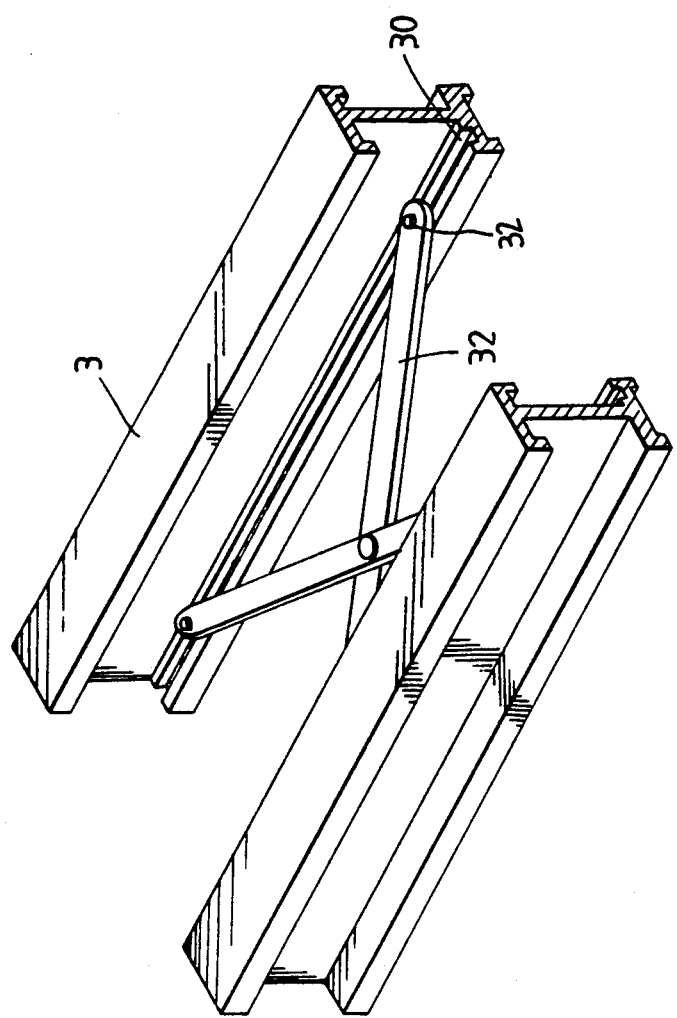
FIG. 9 is a perspective view of an alternate form of the overhead conductor carrying frame assembly of the present invention.

Referring to FIGS. 9 and 10, therein illustrated is an alternate form of the overhead conductor carrying frame assembly. In this embodiment, the conductor carrying frame assembly comprises two parallel rails 3 connected by a plurality of crossed rods 32. The structure of the crossed rods remains unchanged. The two parallel rails 3 each has an elongated groove 30 at an inner side for connecting the crossed rods 32 by adjusting screws 31. By means of loosening the adjusting screws 31, the crossed rods 32 can be moved to slide along the grooves 30 on the two parallel rails 3, and therefore, the contained angle of each crossed rods 32 and the pitch between the two parallel rails 3 can be adjusted.

Figure 12:
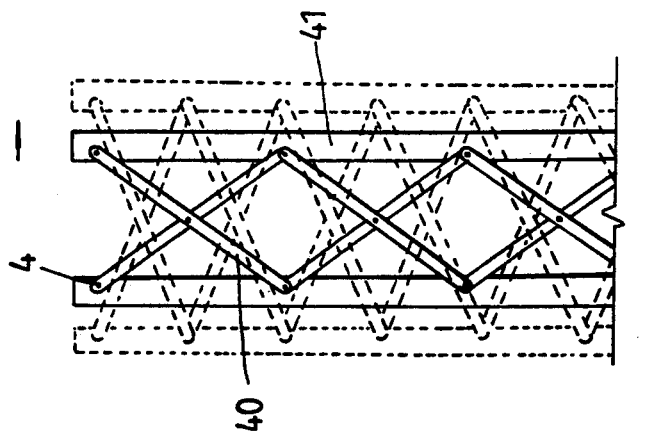
FIG. 12 illustrates that the overhead conductor carrying frame assembly of FIG. 11 is adjusted to change the pitch between the two parallel rails thereof.
Figure 11:
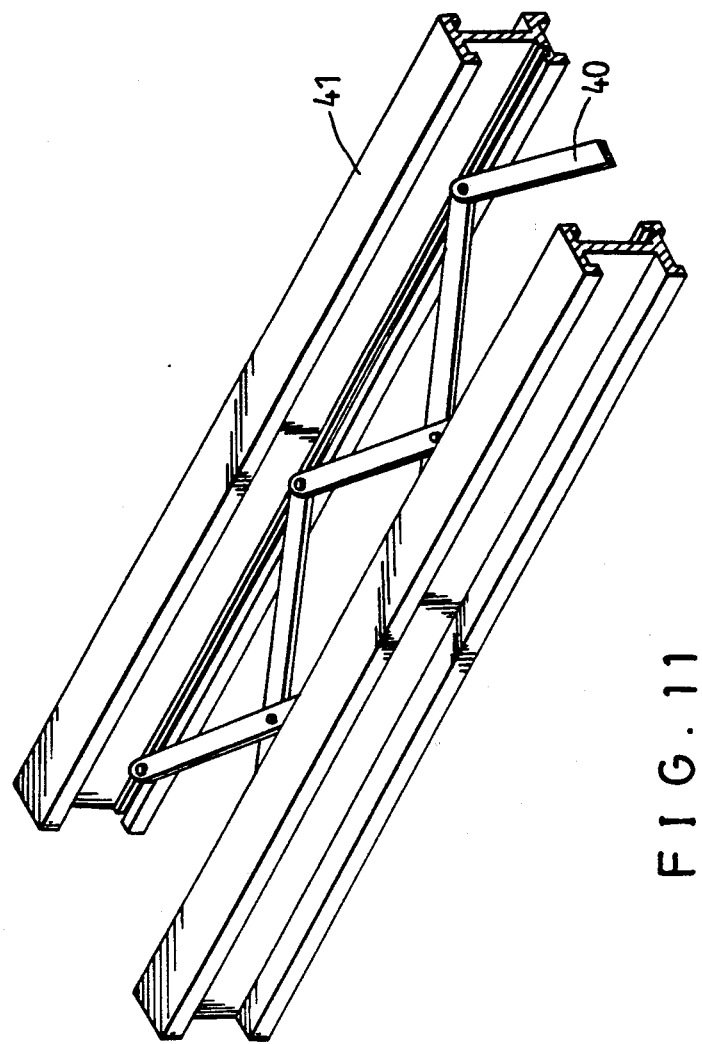
FIG. 11 is a perspective view of another alternate form of the overhead conductor carrying frame assembly of the present invention.

Referring to FIGS. 11 and 12, therein illustrated is another alternate form of the overhead conductor carrying frame assembly. In this embodiment, the crossed rods 40 and the two parallel rails 41 are similar to the crossed rods and the parallel rails in the embodiments of FIGS. 9 and 10. However, the crossed rods 40 are respectively connected with one another forming into a series of crossed rods. The terminal ends of each crossed rod of the series of crossed rods are movably secured to the parallel rails 41 except that the two front terminal ends 4 of the first crossed rod of the series of crossed rod are fixedly respectively connected to the parallel rails. This arrangement permits the parallel rails 41 to be conveniently extended outwards relative to each other.

I claim:

1. An overhead conductor carrier, comprising a conductor carrying frame assembly for carrying conductors, said conductor carrying frame assembly comprising two parallel rails, and a plurality of crossed rods connected between said two parallel rails, said crossed rods each being comprised of two rods connected together in the form of a cross by an adjusting screw; a suspension gear to suspend said conductor carrying frame assembly from a ceiling, said suspension gear comprising an U-shaped cross bar fixedly fastened to a ceiling of a factory building, two suspension rods movably hanging on said U-shaped cross bar at two opposite ends, two lateral stays respectively connected to said two suspension rods and used in bearing said conductor carrying frame assembly, and a link block to connect said two lateral stays together; and wherein said crossed rods can be adjusted to change their contained angles so as to change the pitch between said two parallel rails according to the quantity of conductors to be carried; said two lateral stays are bilaterally extendibly connected to said link block so that the range therebetween can be adjusted according to the pitch between said two parallel rails.

* * * * *